United States Patent [19]
Cordell

[11] Patent Number: 6,031,989
[45] Date of Patent: *Feb. 29, 2000

[54] METHOD OF FORMATTING AND DISPLAYING NESTED DOCUMENTS

[75] Inventor: John P. Cordell, Bellevue, Wash.

[73] Assignee: Microsoft Corporation, Redmond, Wash.

[ * ] Notice: This patent issued on a continued prosecution application filed under 37 CFR 1.53(d), and is subject to the twenty year patent term provisions of 35 U.S.C. 154(a)(2).

[21] Appl. No.: 08/807,637

[22] Filed: Feb. 27, 1997

[51] Int. Cl.$^7$ .............................. G06F 17/00; G06F 17/30
[52] U.S. Cl. ......................... 395/701; 707/513; 707/515
[58] Field of Search .................................. 707/513, 515, 707/516, 517; 395/200.64, 200.57, 701

[56] References Cited

U.S. PATENT DOCUMENTS

| | | | |
|---|---|---|---|
| 5,659,729 | 8/1997 | Nielsen | 707/3 |
| 5,732,219 | 3/1998 | Blumer et al. | 395/200.57 |
| 5,745,908 | 4/1998 | Anderson et al. | 707/513 |
| 5,745,909 | 4/1998 | Perlman et al. | 707/513 |
| 5,745,910 | 4/1998 | Piersol et al. | 707/515 |

FOREIGN PATENT DOCUMENTS

0818742 A1  1/1998  European Pat. Off. ........ G06F 17/30

OTHER PUBLICATIONS

Laura Lemay, Web Publishing with HTML 3.2, Sams.net, 1996, Chapter 14, pp. 387–409.

Raggett et al., HTML 3, Addison Wesley Longman, Jun. 1996, pp. 213–245.

Laura Lemay, Teach Yourself Web Publishing with HTML 3.2 in 14 Days, Sams.net, Jun. 1996, pp. 687–705.

*Primary Examiner*—Thomas R. Peeso
*Assistant Examiner*—Demetra R. Smith
*Attorney, Agent, or Firm*—Klarquist Sparkman Campbell Leigh & Whinston, LLP

[57] ABSTRACT

A new reference tag is provided as an extension to the HyperText Markup Language (HTML). The new reference tag allows nesting of HTML and other electronic documents within a main HTML document obtained from a computer network such as the Internet or an intranet while maintaining all the layout and presentation capabilities of HTML in both the main and nested documents. The new reference tag is implemented as a container tag. If a client network applications understands the new reference tag, nested documents are displayed for a user. If the client network application does not understand the new reference tag, then the other HTML information tags contained between the beginning and end of the reference tag (i.e. the reference tag container) are used to display information for a user.

30 Claims, 7 Drawing Sheets

METHOD OF FORMATTING AND DISPLAYING NESTED DOCUMENTS

FIELD OF INVENTION

The present invention relates to formatting and displaying information contained within a document obtained from computer networks. More particularly, the present invention relates to formatting text, graphical images and other information for an electronic document nested with a main electronic document used on computer networks like the Internet or an intranet.

BACKGROUND AND SUMMARY OF THE INVENTION

The Internet is a world-wide network of cooperating computer networks. Connected to the Internet are thousands of individual computers, each with a variety of application programs. From a user's point of view, access to the Internet and its services typically are accomplished by invoking a network application program (e.g., a network browser). The network application program acts as an interface between the user and the Internet. Network application programs are typically "client" applications that accept commands from the user and obtain Internet data and services by sending requests to "server" applications on other computers at other locations on the Internet.

There are many types of client network applications known in the art including network browsers such as the Internet Explorer® by Microsoft Corporation of Redmond, Wash., Netscape Navigator™ by Netscape Communications of Mountain View, Calif., and Mosaic™ by the National Center for Supercomputer Applications (NCSA) of Champaign-Urbana, Ill. These network browsers send network requests via the File Transfer Protocol (FTP), Simple Mail Transfer Protocol (SMTP), HyperText Transfer Protocol (HTTP), Gopher document protocol and others. The network requests are used to exchange data with computer networks such as the Internet or an intranet.

HTTP is a protocol used to access data on the World Wide Web. The World Wide Web is an information service on the Internet containing electronic documents created in the HyperText Markup Language (HTML). HTML allows embedded "links" or Uniform Resource Locators (URLs) to point to other data or electronic documents, which may be found on the local computer or other, remote Internet or intranet host computers. HTML document links may retrieve the data by use of HTTP, FTP, Gopher, or other Internet application protocols. The Virtual Reality Modeling Language (VRML) is also used to create documents for the World Wide Web. Specifically, VRML is typically used to create three-dimensional graphical information documents. HTML documents are electronic documents that typically contain text, graphical images, animation sequences, audio and video clips, and other information that is displayed by a network browser on a display device for a user.

HTML allows the author of a document to split the information displayed by a network browser into a number of rectangular areas called "frames." HTML frames are created with the HTML <FRAME> and <FRAMESET> tags which are known to those skilled in the art. For more information see Chapter 9, "Designing Tables and Frames" in *Web Publishing Unleased*, by William Robert Stanek, Sams.Net Publishing, Indianapolis, Ind., 1996. Each frame can then separately display a HTML document or other HTML object (e.g., a photographic image) specified by a separate URL. For example, an author can create multiple frames to display text in one frame, a photographic image in another, and an animated sequence in a third frame. Authors can also specify a frame specifically for the purpose of navigational elements such as graphical toolbars. Clicking on the graphical toolbar frames with a mouse or other pointing device will update the content of other frames displayed.

One problem with HTML frames is that they can only specify a static "tiling" of the display area. Frames are a set of non-overlapping, static rectangles created with very strict layout constraints. This is a very different layout model from which HTML provides. The layout of a document within a frame cannot be changed once the frame is created.

Yet another problem with HTML frames is that arbitrary HTML documents cannot be "nested." When a HTML frame is displayed, a HTML document is used to display HTML information in the frame (e.g., text, images, graphics, etc). The frame behaves like a static "window" which is used by the client network application to display information to a user. If a reference is made (e.g., with a link, URL, reference tag, etc.) to a second HTML document within the first HTML document used to display the HTML frame, the second HTML document is read in and laid out in the HTML frame. The second document layout replaces all of the first document display and layout characteristics in the HTML frame. This prevents an author from nesting any arbitrary HTML document inside another. Without document nesting, a second HTML document cannot be displayed within a first HTML document without overwriting all the layout and display characteristics of the first HTML document. It is often desirable to keep the layout and display characteristics of the first HTML document (e.g., a home page) and display a second "nested" HTML document (e.g., a second or alternate home page) using only a small portion of the display area in the frame used to display the first HTML document. The <FRAME> and <FRAMESET> tags in HTML do not allow arbitrary document nesting. However, the <FRAME> and <FRAMESET> tags do allow some degree of nesting, but the containing document is required to be a <FRAME> document that has restricted layout characteristics. HTML frames do allow a number of documents to be displayed side-by-side, but do not allow overlapping or true nesting of documents. The frame container itself cannot display many of the visual presentation and display content attributes associated used to display a HTML document, as it is limited by strict frame layout constraints.

Yet another problem occurs if an author tries to extend the existing HTML <FRAME> and <FRAMESET> tags to overcome some of the strict frame layout constraints. A "downlevel client" problem occurs when existing HTML tags are extended. A HTML reference tag is extended when attributes or parameters are added to the HTML reference tag that are not a part of the current HTML standard. Older client software (e.g., earlier versions of a network browser) cannot interpret the HTML extensions and will not properly display the extended HTML tags since the older client software was created using the current HTML standard. The browser will typically create an incomplete or garbled display area for a user, or ignore the extensions all together. To prevent improper display of the HTML extensions, an author would have to create and maintain multiple copies of each HTML document, one for each version of every network browser that could be used to display the document. This is an inefficient process and wasteful process, and causes a significant impact for the server computers on which the multiple documents are stored (e.g., wastes significant storage space).

In accordance with an illustrative embodiment of the present invention, the problems associated with existing HTML frames are overcome. A method for formatting a HTML document that allows the nesting of other documents within the HTML document is provided. The method is used to specify one or more nested documents (i.e., other electronic documents) which will be displayed within a main document by inserting a new reference tag into a main electronic document (e.g., a HTML document). The new reference tag is also used to specify the display layout (e.g., alignment, border, width, height, horizontal spacing and vertical spacing) of the nested documents, and the display techniques (e.g., frame border, margin height, margin width, nested document name, and source location after nested document) used for presenting the nested electronic documents within the main document. The method allows the nesting of documents within a main electronic document while maintaining all the layout and presentation capabilities used to display the main electronic document.

The illustrative embodiment of the present invention also includes a method for displaying a main electronic document with nested documents. The method includes parsing the main electronic document with nested documents with a client network application. When the new reference tag to a nested electronic document is encountered, the layout information and display techniques to be used for presenting the nested electronic documents within the main electronic document from the reference tag are determined. The nested electronic document is displayed within the main electronic document using the layout information and display techniques determined from the reference tag.

The new reference tag achieves good "downlevel client" behavior by implementing the reference tag as a "container tag." Everything between a beginning reference and an ending reference tag marker (i.e., the other HTML information tags) is ignored by newer client network applications which can understand the new reference tag. The attributes within the new reference tag contain the nested document information. Older client network applications ignore the new reference tag markers, and instead use any HTML information tags included between the beginning and ending reference tag markers to display information to a user. This allows a document author to construct one document with nested documents for newer client software, which can still be properly displayed by older client software.

The new HTML reference tag provides an extension to the HTML language and gives an electronic document author the ability to embedded nested documents in a HTML document stored on a server computer on the World Wide Web, the Internet, and other computer networks such as intranets.

The foregoing and other features and advantages of the illustrated embodiment of the present invention will be more readily apparent from the following detailed description, which proceeds with reference to the accompanying drawings.

DETAILED DESCRIPTION OF AN ILLUSTRATIVE EMBODIMENT

Figure 1:
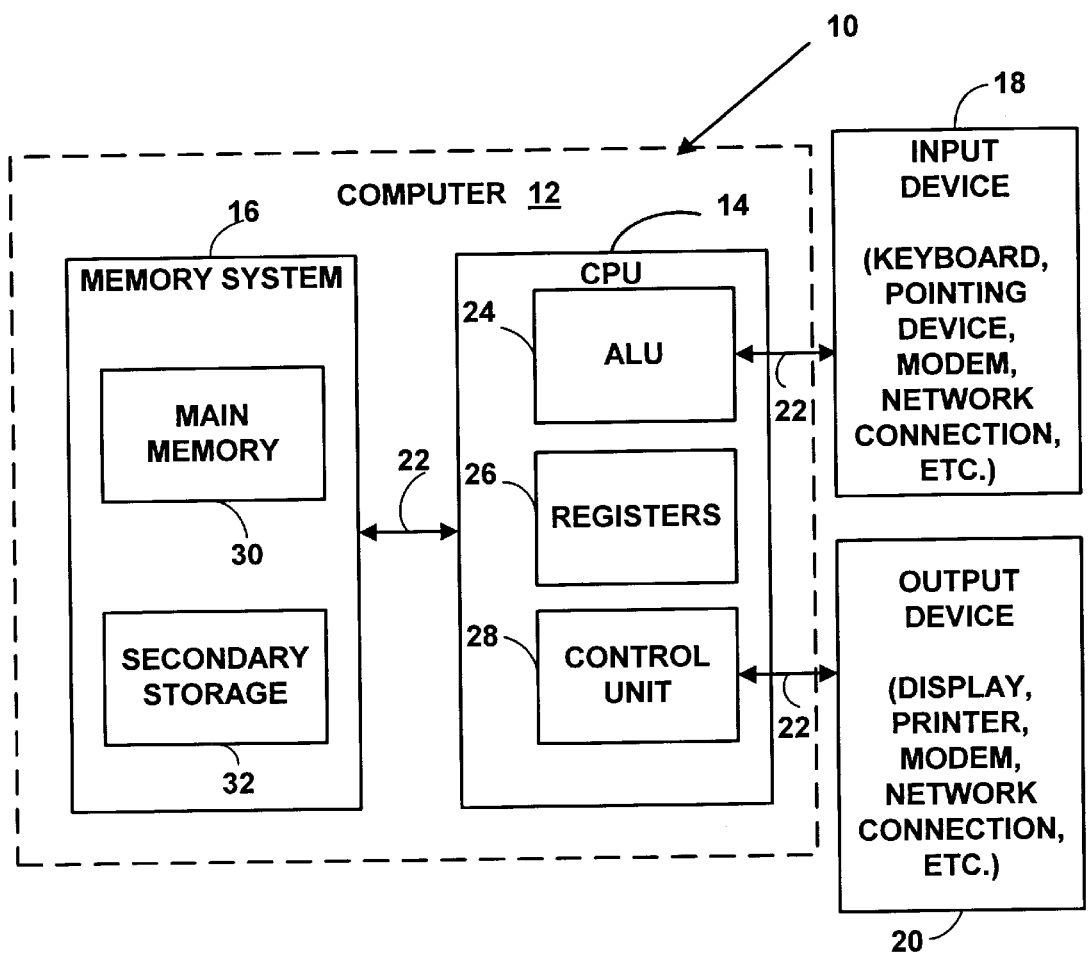
FIG. 1 is a block diagram of a computer system used to implement an illustrative embodiment of the present invention.

Referring to FIG. 1, an operating environment for the preferred embodiment of the present invention is a computer system 10 with a computer 12 that comprises at least one high speed processing unit (CPU) 14, in conjunction with a memory system 16, an input device 18, and an output device 20. These elements are interconnected by a bus structure 22.

The illustrated CPU 14 is of familiar design and includes an ALU 24 for performing computations, a collection of registers 26 for temporary storage of data and instructions, and a control unit 28 for controlling operation of the system 10. Any of a variety of processors, including those from Digital Equipment, Sun Microsystem, MIPS, IBM, Motorola, NEC, Intel, Cyrix, AMD, Nexgen and others are equally preferred for CPU 14. Although shown with one CPU 14, computer system 10 may alternatively include multiple processing units.

The memory system 16 includes main memory 30 and secondary storage 32. Illustrated main memory 30 is high speed random access memory (RAM) and read only memory (ROM). Main memory 30 can include any additional or alternative high speed memory device or memory circuitry. Secondary storage 32 takes the form of long term storage, such as ROM, optical or magnetic disks, organic memory or any other volatile or non-volatile mass storage system. Those skilled in the art will recognize that memory 16 can comprise a variety and/or combination of alternative components.

The input and output devices 18, 20 are also familiar. The input device 18 can comprise a keyboard, mouse, pointing device, audio device (e.g., a microphone, etc.), or any other device providing input to the computer system 10. The output device 20 can comprise a display, a printer, an audio device (e.g., a speaker, etc.), or other device providing output to the computer system 10. The input/output devices 18, 20 can also include network connections (e.g., Internet and intranet connections), modems, or other devices used for communications with other computer systems or devices.

As is familiar to those skilled in the art, the computer system 10 further includes an operating system and at least one application program. The operating system is software which controls the computer system's operation and the allocation of resources. The application program is software that performs a task desired by the user, making use of computer resources made available through the operating system. Both are resident in the illustrated memory system 16.

In accordance with the practices of persons skilled in the art of computer programming, the present invention is described below with reference to acts and symbolic representations of operations that are performed by computer system 10, unless indicated otherwise. Such acts and operations are sometimes referred to as being computer-executed. It will be appreciated that the acts and symbolically represented operations include the manipulation by the CPU 14 of electrical signals representing data bits which causes a resulting transformation or reduction of the electrical signal representation and the maintenance of data bits at memory locations in memory system 16 to thereby reconfigure or otherwise alter the computer system's operation, as well as other processing of signals. The memory locations where data bits are maintained are physical locations that have particular electrical, magnetic, optical, or organic properties corresponding to the data bits.

The data bits may also be maintained on a computer readable medium including magnetic disks, and any other volatile or non-volatile mass storage system readable by the computer 12. The computer readable medium includes cooperating or interconnected computer readable media, which exist exclusively on computer system 10 or are distributed among multiple interconnected computer systems 10 that may be local or remote.

In an illustrative embodiment of the present invention, the computer system 10 preferably uses the Windows® 95 client/server operating system. However, other client/server operating systems (e.g. Windows NT™, Windows CE, OS/2®, by IBM, etc.) could also be used. A client/server operating system is an operating system which is divided into multiple processes of two different types: server processes, each of which typically implements a single set of services, and client processes, which request a variety of services from the server processes.

The Windows® 95 operating system allows users to execute more than one program at a time by organizing the many tasks that it must perform into "processes." The operating system allocates a portion of the computer's resources to each process and ensures that each process's program is dispatched for execution at the appropriate time and in the appropriate order.

Figure 2:
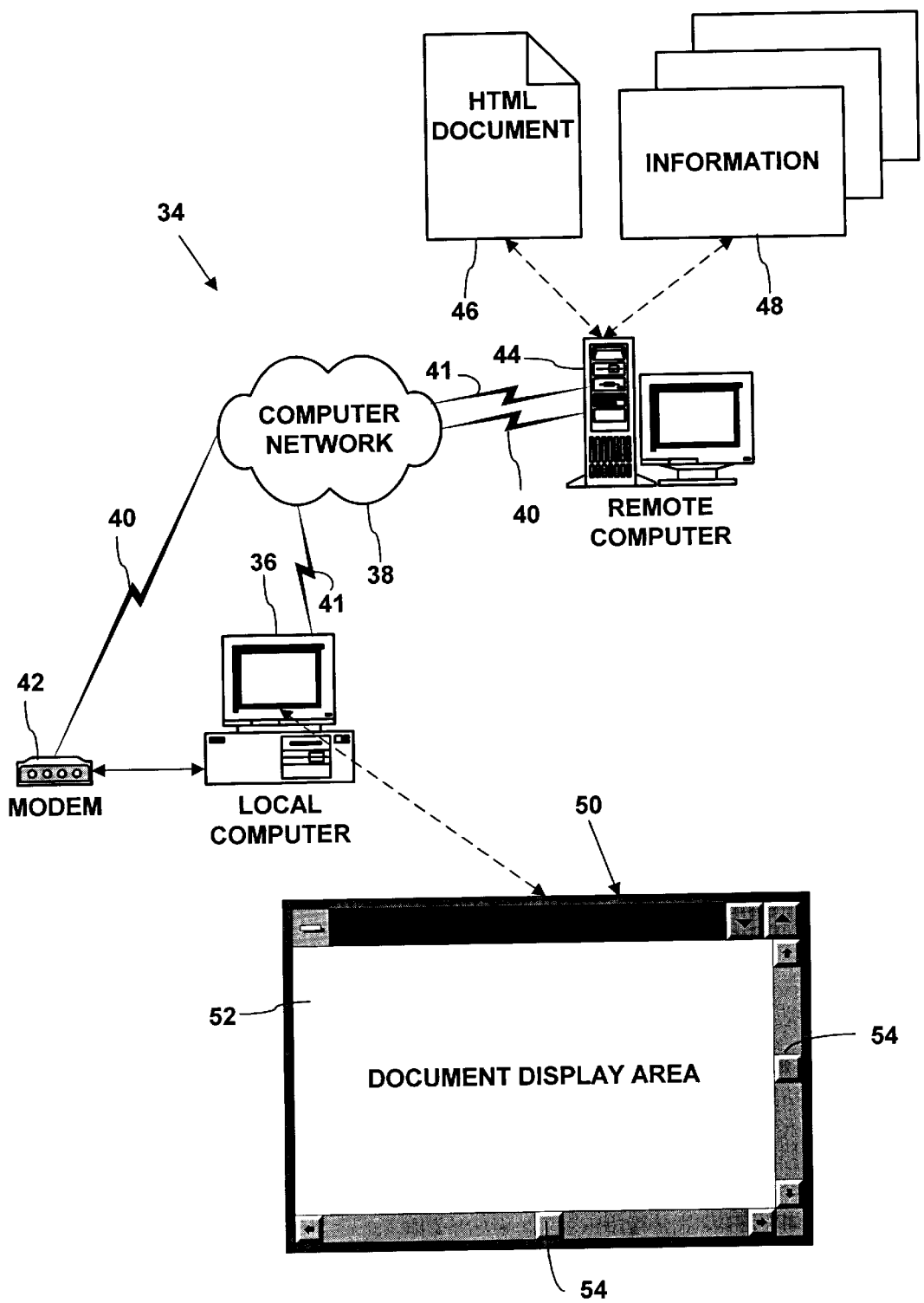
FIG. 2 is a block diagram illustrating a network browsing environment.

FIG. 2 shows a browsing environment 34 of an illustrative embodiment of the present invention. A local computer 36 (e.g., computer system 10 shown in FIG. 1) runs software, referred to herein as a "browser," for unified browsing of electronic documents and other data from local sources (e.g., the memory system 16 of FIG. 1) and from a computer network 38 (e.g., the Internet, an intranet). The browser can be integrated with the operating system software, or can be a separate application software. The illustrated remote computer network 38 is the Internet, an intranet, or other computer network. In the illustrated browsing environment 34, the local computer 36 connects to the computer network 38 over a telephone line 40 via a modem 42. Other physical connections 41 to the computer network alternatively can be used, such as an ISDN, T1, DS1 or other high speed telecommunications connections and appropriate connection device, a television cable and modem, a satellite link, an optical fiber link, an Ethernet or other local area network technology wire and adapter card, radio or optical transmission devices, etc. The invention can alternatively be embodied in a browsing environment for other public or private computer networks, such as a computer network of a commercial on-line service or an internal corporate local area network (LAN), an intranet, or like computer network.

Documents for browsing with a browser can reside as files of a file system stored in the computer's secondary storage 32 (FIG. 1), or reside as resources at a remote computer 44 (also referred to as a "site" or "store") connected to the computer network 38, such as a World Wide Web site on the Internet. The illustrated document 46 residing at the remote computer conforms with HTML standards, and may include extensions and enhancements of HTML standards. However, the browser also can browse documents having other data formats (e.g., Virtual Reality Modeling Language (VMRL), Microsoft® Word documents, etc.) from the local computer 36 or remote computer 44. In conformance with HTML, the illustrated document 46 can incorporate other additional information content 48, such as graphical images, audio, video, executable programs, etc. which also reside at the remote computer 44 or other remote computers. The document 46 and information 48 preferably are stored as files in a file system of the remote computer 44. The document 46 incorporates the information 48 using HTML tags and Uniform Resource Locators (URLs) that specify the location of files or other Internet resources containing the images on the computer network 38. However, other locating formats can also be used.

When used for browsing documents, the browser displays the document in a window 50 or area of the local computer's 36 display 20 allocated to the browser by the operating system. The illustrated window 50 comprises a document display area 52 and user interface controls 54. The browser displays the document within the document display area 52 of the window 50. However, other display types could also be used.

The browser and other client network applications within the local computer 36 preferably work with electronic documents (which have data formats other than those native to the browser or client application) by encapsulating the document's data into an associated object, and integrating with the object using pre-defined interfaces as described more fully below. This allows full use of all the features described below.

Alternatively, the browser or other client network application can work with an electronic document by launching an application program associated with the document and causing the associated application program to load the document and perform a specified operation on the document. In the Microsoft Windows® 95 operating system, this is done by looking up the application program associated with the document's file name extension in the system registry, (e.g., ".doc" for Microsoft® Word documents, ".vsd" for Shapeware's VISIO drawings, etc.) and a text string command for directing the program to perform a desired operation. The application program associated with a document also may be identified in the Microsoft Windows® operating system by matching a bit pattern at specific offset into the file as also specified in the system registry. The browser or other client network application patches the document's file name into the text string command and invokes the operating system's shell execute service to execute the command. Shell execute is a well known Windows® operating system service which issues a text string as a command to the operating system's command interpreter (i.e., the "command.com" program in the Windows® operating system).

The text string generally is in the form of an MS-DOS command, which specifies a path and file name of the associated application program's executable file, a flag for specifying the desired operation, and the document's path and file name. The command interpreter responds by parsing the text string, loading the application program specified in the text string, and passing the flag and the document's path and file name as command line arguments into the application program. The application program then "opens" (i.e., loads) the document and performs the operation specified by the flag.

Figure 3:
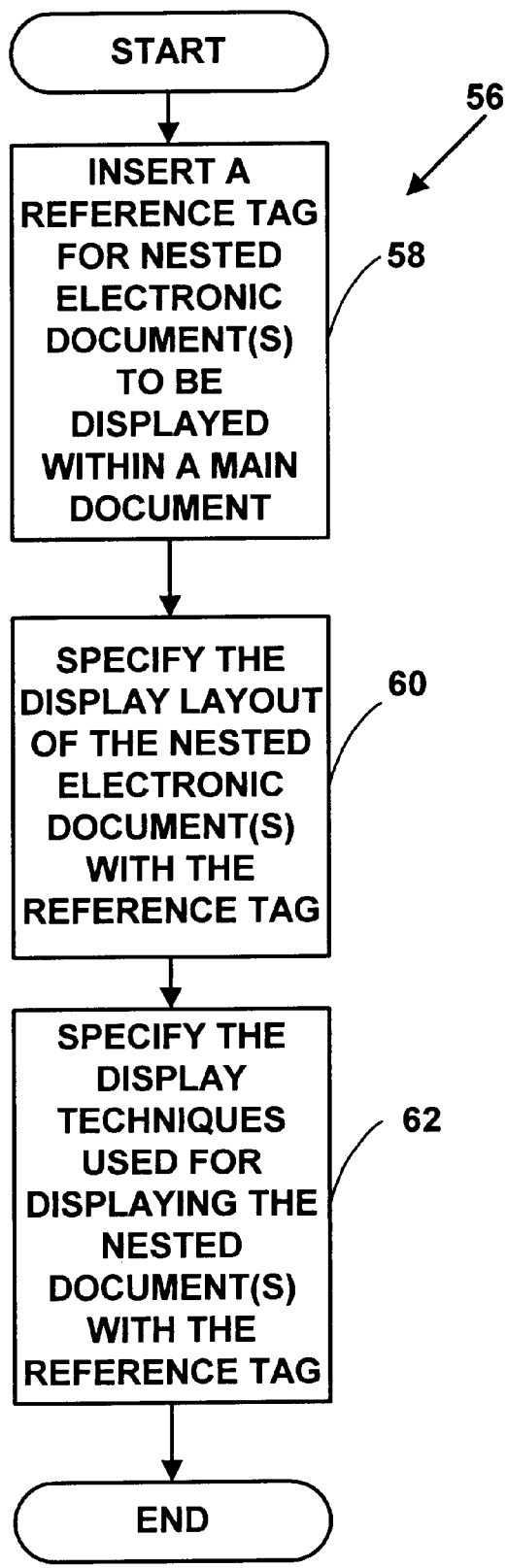
FIG. 3 is a flow diagram illustrating a method according to the invention for formatting an electronic document.

FIG. 3 is a flow diagram illustrating a method 56 according to the invention for formatting an electronic document (e.g., a HTML document) to provide nested documents (e.g., other HTML documents, graphical images, etc.) within the electronic document. In a first step 58, one or more nested electronic documents to be displayed within a main electronic document are specified with a reference tag (e.g., new HTML <IFRAME></IFRAME> reference tags described below). In a second step 60, the display layout of the nested electronic documents to be displayed within the main electronic document is specified with the reference tag. This layout includes determining the alignment, border, width, height, horizontal spacing, and vertical spacing of the nested document. However, more or fewer display layout characteristics can be used. In a third step 62, the display techniques for the nested electronic documents are specified with the reference tag. The display techniques include the frame border, margin height, margin width, nested document name, the source location of the nested document (i.e., on the local or remote computer), re-sizing and scrolling capabilities. However, more or fewer display techniques could also be used. Method steps 58–62 are completed by designating display layout display techniques and within a HTML <IFRAME><IFRAME> reference tag pair.

A HTML tag pair <IFRAME></IFRAME> is a new reference tag used to provide the method 56 described above, where <IFRAME> designates the beginning of a "reference tag" or a beginning reference tag marker, which designates nested electronic documents within a main electronic document, and </IFRAME> designates the end of the reference tag, or an ending reference tag marker. The HTML <IFRAME></IFRAME> reference tag pair has the following syntax:

<IFRAME, attribute 1, attribute 2, . . . attribute N> HTML information tags

</IFRAME> where attribute 1-attribute N include alignment, border, frame border, height, horizontal spacing, nested document identifier, margin height, margin width, nested document name, nested document source location, nested document identifier, resizing, scrolling, style, vertical spacing, display style, and width attributes used to layout and display a nested document. Each of these attributes will be explained in detail below. The HTML information tags (e.g., <IMG>, <MENU>, <A></A>, etc.) are HTML information tags contained in the nested document that will display information to a user if the new HTML <IFRAME></FRAME> reference tags are not recognized by a client network application. The nested document may contain URLs to other documents on other computers on the computer network. The </IFRAME> reference tag ends the new <IFRAME> reference tag. The atttributes used in the <IFRAME> tag include those described in Table 1:

TABLE 1

| Attribute | Description |
| --- | --- |
| align | Controls the alignment of the nested |
| align=right | document. Aligns a nested document at the |
| align=left | left margin, right margin or center margin. |
| border | Controls a border type around the nested |
| border=4 | document. A numerical value indicates the |
| | width of the line to be drawn in pixels. |
| frameborder | Controls a 3D frameborder around the |
| frameborder=0 | nested document, 0= no frame border, 1 = |
| | frame border |
| height | Controls the height of the nested document |
| height=150 | in pixels. |
| hspace | Controls the horizontal spacing around a |
| hspace=10 | nested document in pixels. Can be used to |
| | create a gap around text. |
| id | Controls the identification of individual |
| id=7 | nested document elements displayed using |
| | numerical values |
| marginheight | Controls the margin height of a container in |
| marginheight=2 | which a nested document appears. |
| marginwidth | Controls the margin width of a container in |
| marginwidth=3 | which a nested document appears. |
| name | Controls nested document interaction with |
| name="main" | other nested documents and other windows. |
| name="nested1" | Default is no name. Once a name is |
| | defined, the nested document can be |
| | targeted by the nested documents. |
| noresize | Controls the ability to adjust the size of the |
| noresize=yes | nested document. Default is user can |
| | resize the nested document. A value of |
| | YES means the nested document cannot be |
| | resized. |
| scrolling | Controls the display of vertical and |
| scrolling=yes | horizontal scroll bars. |
| scrolling=no | A value of YES means the scroll bar is |
| scrolling=auto | always visible, a value of NO means the |
| | scroll bar is never visible, and a value of |
| | AUTO means the browser will automatically |
| | display the scroll bars. |
| src | Controls the source of the nested |
| src="http://www.msn.com/nestdoc.htm" | document. The value is a URL which points |
| | to the location of the nested document. |

TABLE 1-continued

| Attribute | Description |
|---|---|
| style<br>　style={ font-size: 12pt; line height: 14pt; font family: Helvetica;} | Controls the style of the nested document using the Cascading Style Sheet CSS format. |
| vspace<br>　vspace=30 | Controls the vertical spacing around a nested document in pixels. Can be used to push text down to a new position. |
| width<br>　width=400 | Controls the width of the nested document in pixels. |

However, more or fewer attributes could also be used in the <IFRAME> tag.

An <IFRAME> tag designates the beginning of a new "HTML floating frame" which allows for the nesting of documents within a main electronic document (i.e., a HTML document). The new HTML "floating frame" is different than HTML frames described above which are known in the art. However, the <IFRAME> attributes behave in a manner similar to the attributes used for the HTML <FRAMESET> and <IMG> tags when they are encountered by a computer software application such as a client network application. The HTML <FRAMESET> and <IMG> tags are known to those of ordinary skill in the art. For more information on the <FRAMESET> and <IMG> tags see the *Web Publishing Unleashed* book cited above.

The only mandatory attribute in the <IFRAME> tag is the "src" attribute which is used to indicate the source of the nested document. If no other layout or display attributes are specified, default layout and attributes will be used. The nested document could be a local electronic document on a client computer, or a remote electronic document stored on a server computer.

The steps of method 56 are illustrated with the following example as shown in Table 2.

tronic document named "nested1" will be obtained using the URL "http://www.msn.com/nest1doc.htm" and displayed with a three pixel border. A local nested document (i.e., without a HTTP reference) could also be used with the "src=" attribute. The nested document will be laid out with a width of 100 pixels, a height of 200 pixels and be aligned in the middle of the display. The <IMG SRC="picture.gif"> tag is a HTML information tag to display an image which will be explained below.

Figure 4:
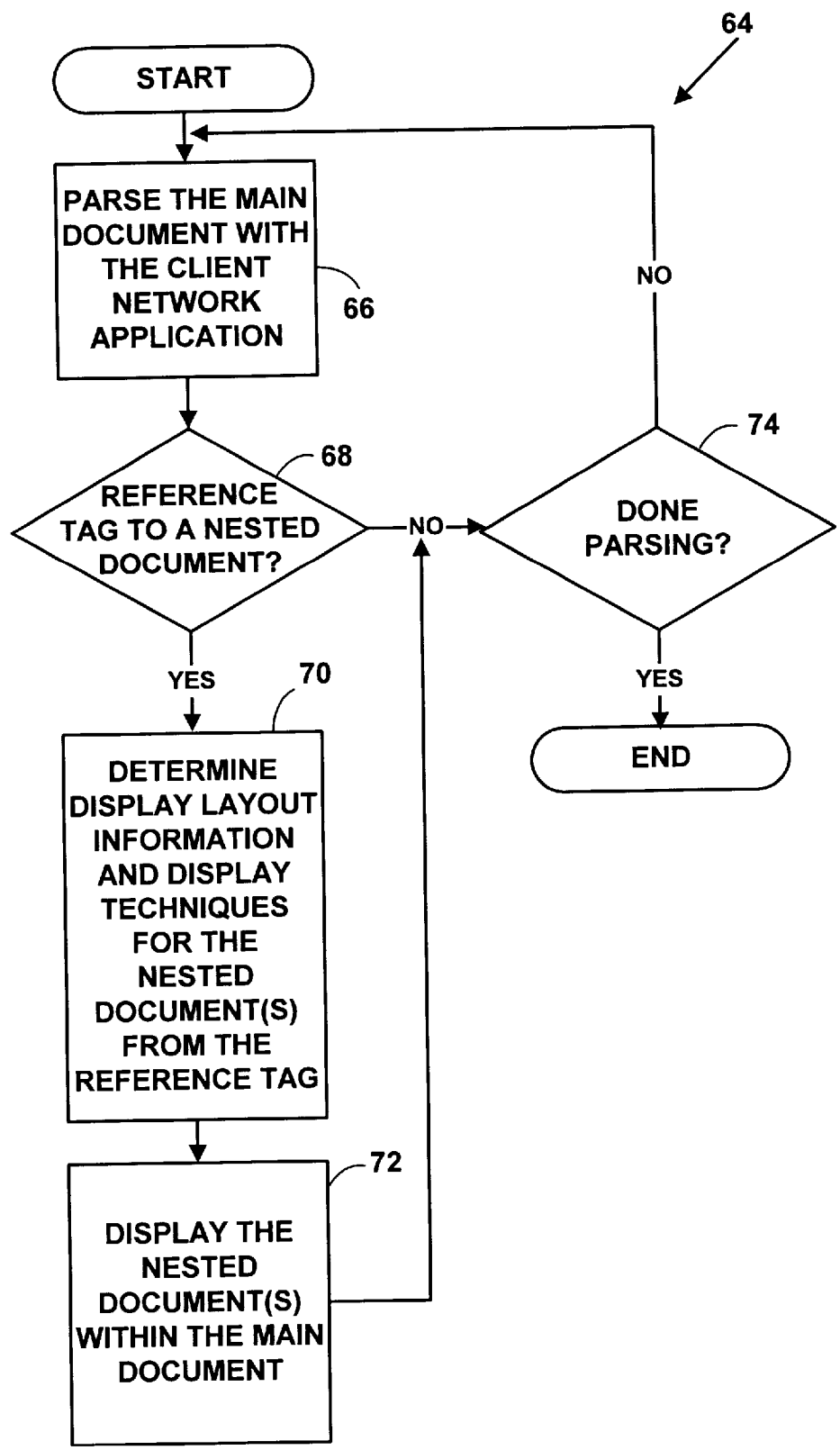
FIG. 4 is a flow diagram illustrating a method according to the invention for displaying an electronic document with nested documents.

FIG. 4 is a flow diagram of a method 64 according to the invention for displaying a main electronic document (i.e., a HTML document) with one or more nested documents. The main electronic document can be stored on the client computer or on a remote server computer and is an electronic HTML document. The main electronic document with one or more nested documents is parsed with a client network application (e.g., a network browser browses the main document) at step 66. When a reference to a nested document is encountered (i.e., a <IFRAME></IFRAME> tag pair) at step 68, the display layout information and display techniques are determined at step 70 (i.e., from the <IFRAME> tag). The nested document is displayed within the main document at step 72 using the determined layout information and display techniques. Method 64 may be used to display any of the one or more nested documents encoun-

TABLE 2

```
<IFRAME> name="nested1" src="http://www.msn.com/nest1doc.htm" border=3 width=100
height=200 align=middle>
        <IMG SRC="picture.gif">
</FRAME>
```

Method step 58 is illustrated with the <IFRAME></FRAME> reference tag pair inserted into a main electronic document. The display layout of the nested document is specified at step 60 with the width=100, height=200 and align=middle attributes. The display techniques used for displaying the nested document are specified at step 62 with the name="nested1", src="http://www.msn.com/nest1doc.htm", and the border=3 attributes. A nested electered in the main document. Parsing continues until all of the main document is parsed at step 74.

The present invention offers several advantages over the prior art <FRAMESET><FRAME> tag approach. HTML frames known in the art are a set of non-overlapping, static rectangles with very strict layout constraints. The following example in Table 3 illustrates the creation of three frames using the prior art <FRAMESET> tag.

TABLE 3

```
<FRAMESET ROWS="25%,75%">
    <FRAMESET COLS="50%, 50%">
        <FRAME SRC="frame1.htm"> <! local file>
        <FRAME SRC="frame2.htm">
    </FRAMESET>
        <FRAME SRC="http://www.acme.com/frame3.htm"> <! remote file>
</FRAMESET>
```

Figure 5:
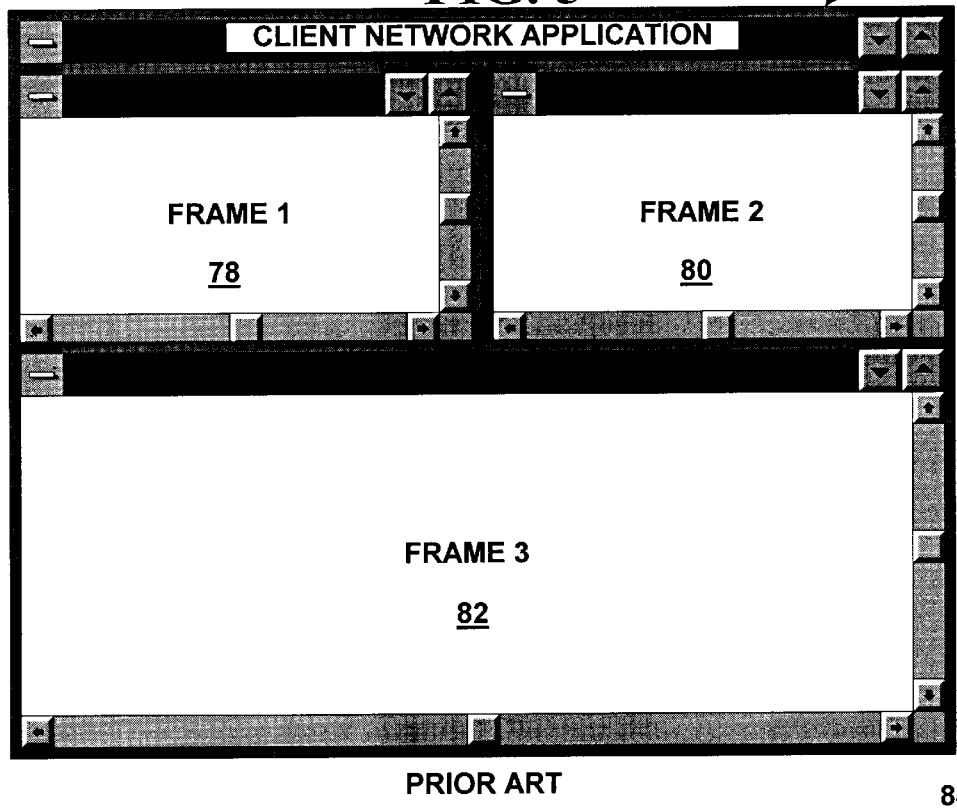
FIG. 5 is a block diagram showing frames created with the prior art HTML <FRAMESET> and <FRAME> tags.

Two rows are defined, the first row occupies 25% of the display area, and the second row occupies 75% of the display area. The first row (i.e., covers 25%) is divided into two columns of equal size, both 50% of the display area. The source file for frame one is a local HTML document called "frame1.htm." The source files for frames two and three are "frame2.htm" and "frame3.htm respectively. FIG. 5 shows a screen display 76 created with a client network application using the prior art frame example shown above in Table 3. The three frames 78–82 are created. The three frames 78–82 are static display rectangles the layout characteristics of which cannot be modified after they are created. This prevents an author from nesting another document inside the documents used to create the frames, thereby limiting the author's overall design and display capabilities.

In contrast to the prior approach, the illustrative embodiment of the present invention uses the new "floating frames" designated with a new reference tag such as an <IFRAME></IFRAME> tag pair. The following HTML example file "main.htm" shown in Table 4, creates nested documents within a main document.

displays the text "NESTED DOCUMENT 1" 90 in the first nested document display area 88 within the main document display area 86. However, other simpler or more complicated documents could also be used for a nested document.

The text "DISPLAY NESTED DOCUMENT A" 92 and "DISPLAY NESTED DOCUMENT B" 94 are links (i.e., URLs <A HREF="http://www.msn.com/nest1a.htm" TARGET="one">1. DISPLAY NESTED DOCUMENT A</A> <A HREF="http://www.msn.com/nest1b.htm" TARGET="one">2. DISPLAY NESTED DOCUMENT B</A>) which will display additional HTML documents in the first nested document display area 88 when selected by a user. The first nested document display area 88 is identified by the HTML link "TARGET=one" attribute which is the name assigned in the two URLs 92, 94 to display information in the first nested document display area 88. When a user selects the display text "1. DISPLAY NESTED DOCUMENT A," 92 with a mouse or other pointing device, the HTML document "nest1a.htm" will be displayed in the first nested document display area 88 (Shown in FIG. 6B and explained below). When a user selects display text "1.

TABLE 4

```
<! main.htm>
<HTML>
<BODY>
        <IFRAME src="http://www.msn.com/nest1.htm" width=200 height=100 NAME="one">
        </IFRAME>
        <A HREF="http://www.msn.com/nest1a.htm" TARGET="one">1. DISPLAY NESTED DOCUMENT A</A>
        <A HREF="http://www.msn.com/nest1b.htm" TARGET="one">2. DISPLAY NESTED DOCUMENT B</A>
        <IFRAME src="http://www.msn.com/nest2.htm"></IFRAME>
</BODY>
</HTML>
```

Figure 6A:
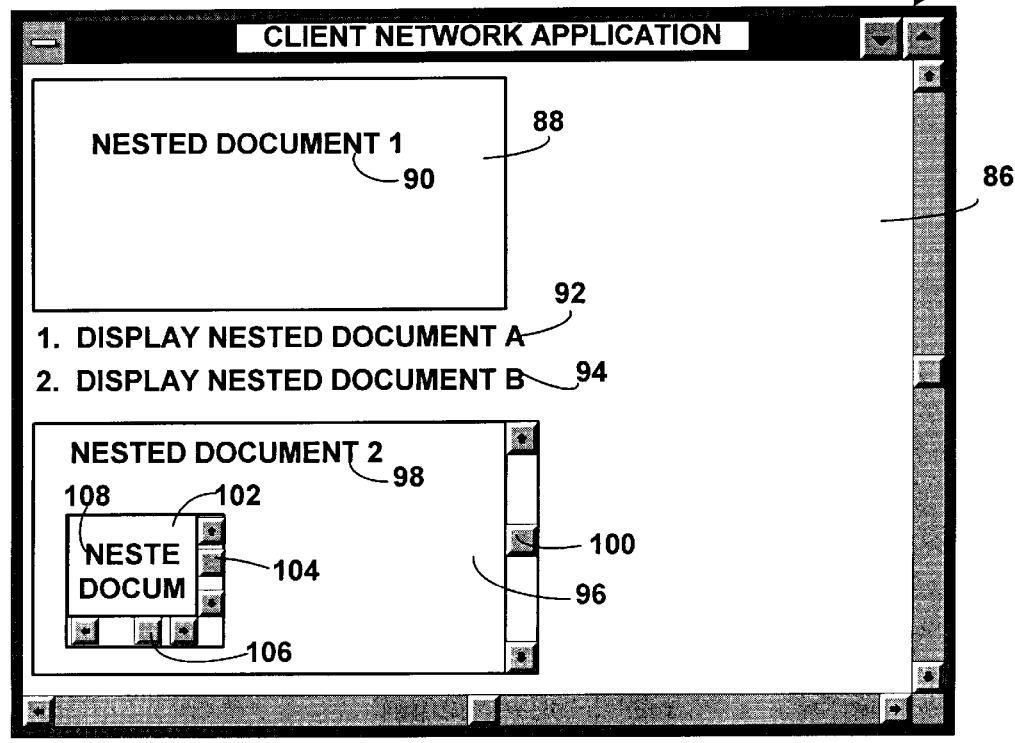
FIGS. 6A and 6B are block diagrams illustrating nested documents for an illustrative embodiment of the present invention.

FIG. 6A shows a screen display 84 created with a client network application (i.e., with Microsoft Internet Explorer® 3.0) using the "main.htm" example file shown above in Table 4 using methods 54 and 64. When a client network application parses the HTML file "main.htm," a main document display area 86 is created. A first nested document display area 88 is created within the main document display area 86 when the <IFRAME> tag (i.e., <IFRAME src="http://www.msn.com/nest1.htm" width=200 height=100 NAME="one"></IFRAME>) is parsed using the <IFRAME> tag display layout and display technique attributes. A first nested document "nest1.htm" displayed in the first nested document display area 86. The "nest1.htm" document is shown below in the HTML example file in Table 5.

TABLE 5

```
<!nest1.htm>
<HTML>
<BODY>
        NESTED DOCUMENT 1
</BODY>
</HTML>
```

The first nested document display area 88 has been assigned the nested document name "one" with the <IFRAME> NAME attribute in the main document "main.htm." The NAME attribute value "one" will be used to load additional documents into the first nested document display area 88. The nested document "nest1.htm" simply DISPLAY NESTED DOCUMENT B," 94 the HTML document "nest1b.htm" will be displayed in the first nested document display area 88. In both cases the main document display area 86 remains the same, only the first nested document display 88 area changes. Example HTML nested document files "nest1a.htm" and "nest1b.htm" are shown below in Tables 6 and 7 respectively. Each additional nested HTML document simply prints the name of the nested document display. However, virtually any HTML document, simple or complex can be used as a nested document.

TABLE 6

```
<!nest1a.htm>
<HTML>
<BODY>
<!Display larger Bold Font>
<B><FONT SIZE=+2>NESTED DOCUMENT ONE A</B></FONT>
</BODY>
</HTML>
```

TABLE 7

```
<!nest1b.htm>
<HTML>
<BODY>
        NESTED DOCUMENT ONE B
</BODY>
</HTML>
```

A second nested document display area 96 (i.e., with "nest2.htm") is created when the client network application parses the second <IFRAME> tag (i.e., <IFRAME src="http://www.msn.com/nest2.htm" ></IFRAME>) in the main document "main.htm." The second nested document display area 96 displays the HTML file "nest2.htm." The contents of the HTML document "nest2.htm" are shown below in Table 8.

TABLE 8

<!nest2.htm>
<HTML>
<BODY>
NESTED DOCUMENT 2
<IFRAME SRC="/nested/nest3.htm" WIDTH=50 HEIGHT=50></FRAME>
</BODY>
</HTML>

This nested document includes the text "NESTED DOCUMENT 2," which is displayed 98 in the second nested document display area 96, and a <IFRAME> tag to create a third nested document within the second nested document. Note the second nested document display area 96 was automatically supplied with a vertical scroll bar 100 since the defined vertical area (i.e., HEIGHT=100) was not large enough to display all the desired information contained in HTML file "nest2.htm." This automatic addition of a scroll bar can be suppressed with the <IFRAME> attribute SCROLLING=NO described above. The default is the addition of a scroll bar whenever necessary.

A third nested document display area 102 is created inside the second nested document display area 96 when the <IFRAME> tag (i.e., <IFRAME SRC="/nested/nest3.htm" WIDTH=50 HEIGHT=50></FRAME) is parsed in "nest2.htm." Note the third document display area 98 has a WIDTH and HEIGHT of 50 pixels and fits within the second document display area 96 (not shown strictly to scale in FIG. 6A). The third nested document display area 102 is automatically created with both a vertical 104 and a horizontal 106 scroll bar since the defined nested display area (i.e., WIDTH=50, HEIGHT=50) is not large enough to display all the desired information. As was discussed above, the automatic addition of scroll bars can be suppressed with the <IFRAME> attribute SCROLLING=NO. The HTML document "nest3.htm" displayed in the third nested document display area 102 is shown below in Table 9.

TABLE 9

<!nest3.htm>
<HTML>
<BODY>
    NESTED DOCUMENT 3
</BODY>
</HTML>

The document "nest3.htm" simply prints "NESTED DOCUMENT3." This document is a local file found in the directory "/nested." Nested documents can be retrieved from local (e.g., "/nested") or remote (e.g., "http://www.msn.com") locations on a computer network like the Internet or an intranet. Note the vertical 104 and horizontal 106 scroll bars would have to be used to see all of the text "NESTED DOCUMENT 3" which is only partially displayed 108 in the third nested document display area 102.

As can be seen from FIG. 6A a main document can have one or more nested documents within it, and each nested document can have one or more nested documents. The layout and presentation of the main document remains the same when nested documents are displayed (unless there are instructions in the nested document to layout and occupy the whole display area).

Figure 6B:
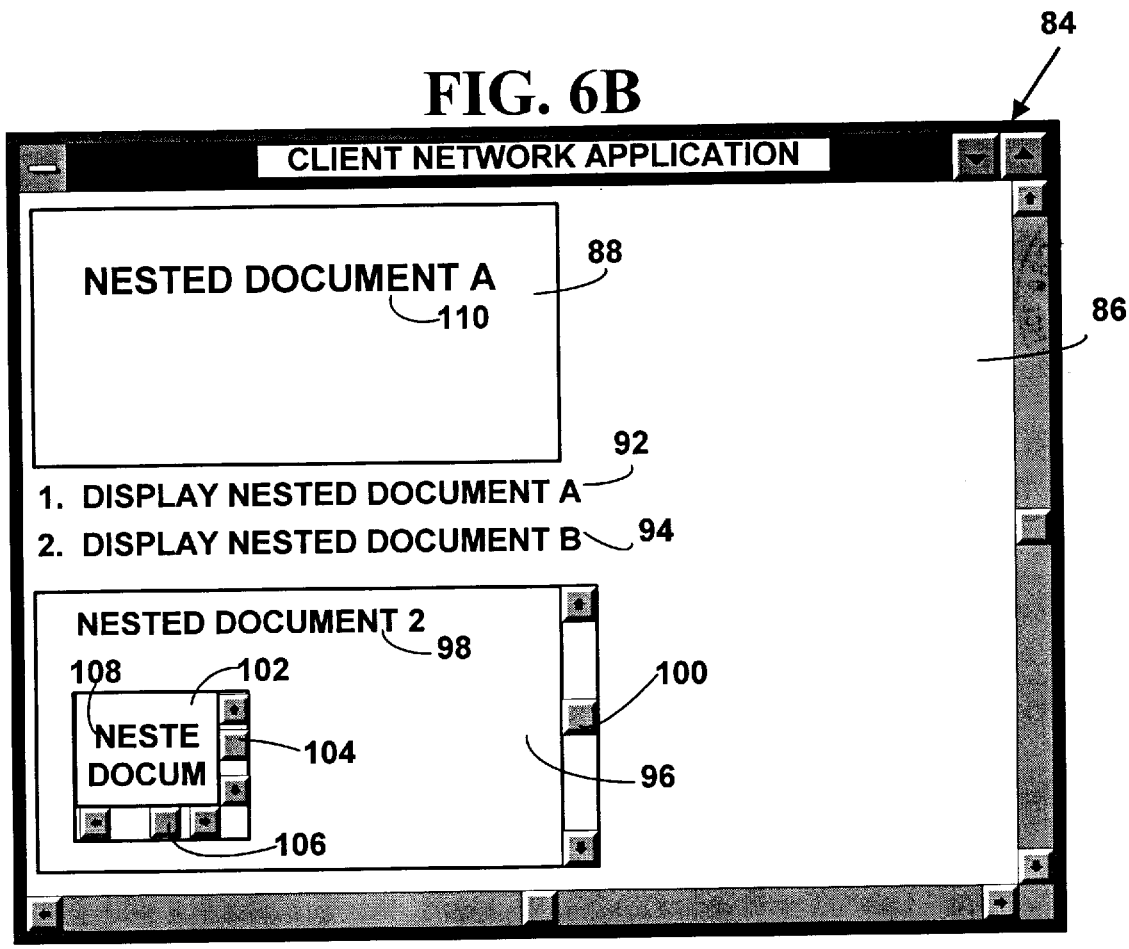

As is shown in FIG. 6B, when a user selects the link "1. DISPLAY NESTED DOCUMENT A" 92 the first nested document display area 88 is updated by displaying the HTML document "nest1a.htm" described above in Table 6. The text "NESTED DOCUMENT A" is displayed 110 as larger (i.e., <FONT SIZE=+2></FONT>) bold (i.e., <B></B>) text in the first nested document as display area 88 (see the "nest1a.htm" source file shown above in Table 6). The main document display area 86, and the second and third document display areas 96, 102 all remain unchanged.

The illustrative embodiment of the present invention gives an author great flexibility for designing documents. An author can nest multiple documents within a main document, and change the layout of the nested documents at any time without significantly affecting the layout and display at the main document. The main document will cover the whole display area and each of the nested documents will cover a small portion of the display area covered by the main document. This is not true for the prior art frames created with the <FRAMESET><FRAME> tags shown in FIG. 5. Each static rectangle that contains a document is a separate frame. Frames do allow a number of documents to be placed next to each other, but do not allow documents to be nested inside other documents.

In another embodiment of this invention, the HTML <FRAMESET><FRAME> tags are improved by using the <IFRAME> </IFRAME> tag pair with the <FRAMESET><FRAME> tags in a HTML document (See Table 3 and discussion above). The <IFRAME></IFRAME> tag pair allows a first HTML document to be displayed within a first HTML frame defined with the <FRAMESET> tag, and a second nested document to be displayed as a second frame within the first frame containing the first HTML document. Nested documents displayed as frames within frames can also have nested documents displayed as a frame within the nested document frames.

Figure 7:
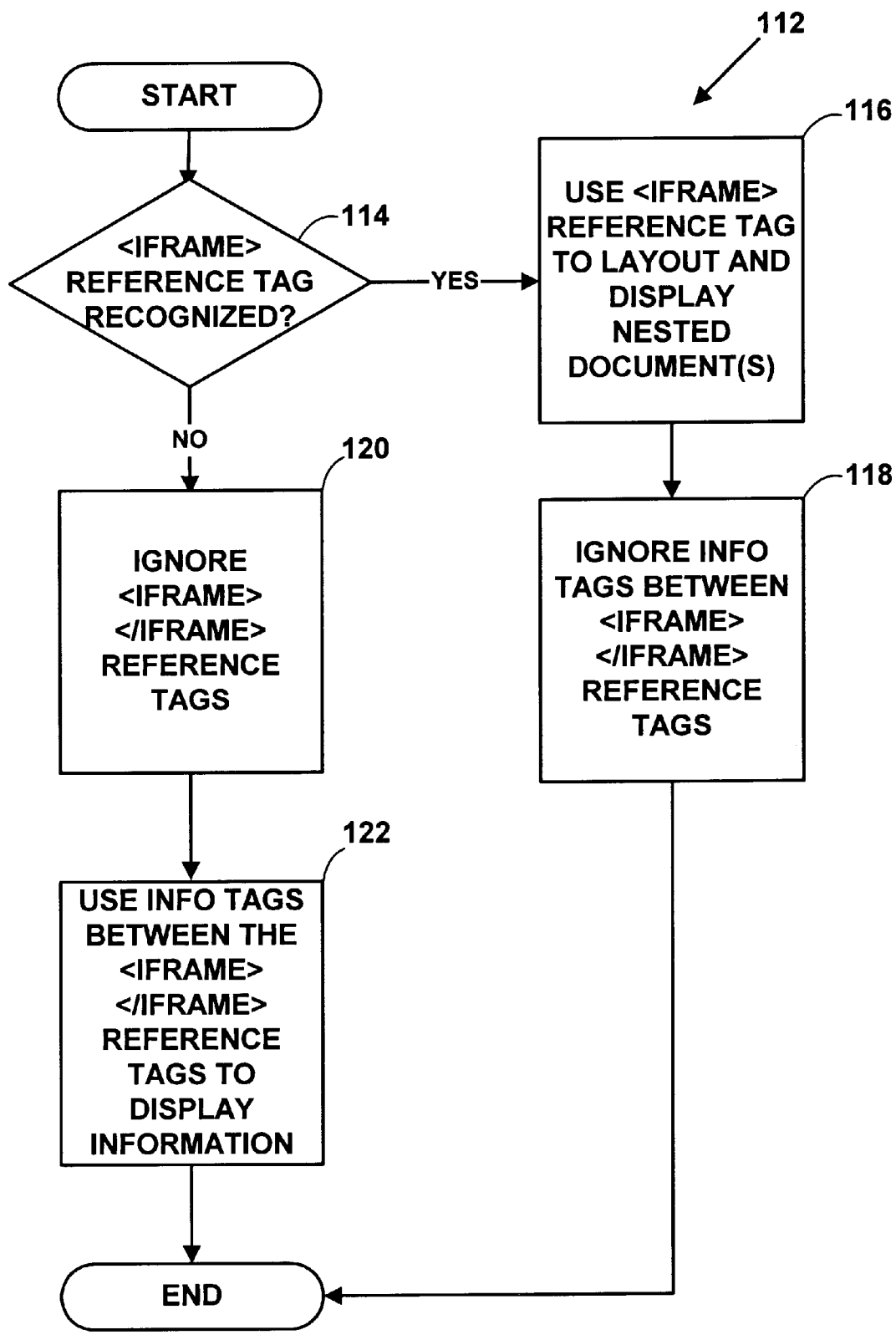
FIG. 7 is a flow diagram illustrating a method according to the invention for displaying nested documents as a container tag.

FIG. 7 is a flow diagram of a method 112 according to the invention for displaying nested documents as a "container tag." A "container tag" typically includes a reference tag and a number of information tags associated with the reference tag. However, a container tag may also include a beginning reference marker tag, an ending reference marker tag, and one or more information tags placed between the beginning and ending reference marker tags in the tag "container." Method 112 is used to implement the new HTML <IFRAME></IFRAME> reference tag pair as a "container tag." However, other HTML tags and other reference tags could also be used. In the illustrative embodiment of the present invention, the information tags associated with the reference tag are HTML information tags. However, other information tags could also be used (e.g., VRML information tags). Returning to FIG. 7, if a client network application recognizes the reference tag (e.g., the <IFRAME></

IFRAME> tag pair) at step 114, the attributes contained in the reference tag are used to layout and display any nested documents at step 116. Everything else (e.g., other HTML information tags in the "container") that may be included between the beginning and ending reference tag markers (i.e., <IFRAME></IFRAME> reference tags) are ignored at step 118. If the client network application does not recognize the reference tag at step 114, the reference tag and their attributes are ignored at step 120, and any information tags included between the reference tag beginning and ending reference tag markers are used to display information at step 122.

Method 112 is illustrated in the following example shown in Table 10.

displayed without problems by new and old client network applications. Method 112 also relieves the author from the burden of creating multiple copies of the same document for various versions of client network applications (e.g., various versions of a network browser), thereby saving a significant amount of computer resources.

In an alternative embodiment of the present invention, a client network application uses both the reference tag at step 116 and any HTML information tags included between the reference tag at step 122 to display information to a user. In this alternative embodiment, the client network application understands the HTML <IFRAME><\IFRAME> reference tags at step 114, and the author of the HTML documents is typically not creating versions of the HTML document for

TABLE 10

<IFRAME src="http://www.msn.com/nest1.htm" width=200 height=100 align=right hspace=20>
    <IMG src="http://www.msn.com/image1.gif" width=200 height=100 align=right>
    </IFRAME>

If the client network application recognizes the <IFRAME></IFRAME> tag pair at step 114, then the src, width, height, align, and hspace attributes will be used to layout and display the nested document at step 116 "nest1.htm". The HTML image tag IMG src="http://www.msn.com/image1.gif" is used to display an image "image1.gif" included between the <IFRAME></IFRAME> reference tag pair is ignored at step 118.

If the client network application does not recognize the <FRAME></IFRAME> reference tag pair at step 114, the information contained within <IFRAME></IFRAME> reference tag pair attributes is ignored at step 120. The HTML image tag IMG src="http://www.msn.com/image1.gif" is used to display an image file "image1.gif" at step 122 to a user with display characteristics similar (e.g., width=200 height=100 align=right ) to those that would have been used for the nested document. However, virtually any HTML or other information tag could be included between the reference tag beginning and ending marker, and the invention is not limited to information tags which display information with characteristics similar to the nested documents to a user. For example, an author might desire a display screen to have one format with nested documents, and a totally different layout and display if nested documents are not recognized.

In the above example in Table 10, the document looks good and is properly displayed to a user in both an environment where a client network application recognizes and does not recognize the reference tag. In an environment where the client network application understands the <FRAME></IFRAME> reference tag pair, nested documents can be laid out and displayed. In an environment where the client network application does not understand the <IFRAME></IFRAME> tag pair, an image is displayed instead of a nested document with a similar size and similar display characteristics as the nested document. Thus, the document looks good and is properly displayed to a user in either environment.

The container tag of method 112 used with the HTML <IFRAME></IFRAME> reference tags and methods 56 and 64 allows an author to create a document that has nested documents for display by newer client network applications, yet at the same time is usable by older client network applications. The flexibility of the container tag allows an author to write a document that will look good, and be client network applications that do not understand the <IFRAME></IFRAME> reference tags. This alternative embodiment provides an author even greater flexibility for designing electronic documents by allowing additional information associated with a nested document to be included between the <IFRAME></IFRAME> tag pair.

It should be understood that the programs, processes, and methods described herein are not related or limited to any particular type of computer apparatus, unless indicated otherwise. Various types of general purpose or specialized computer apparatus may be used with or perform operations in accordance with the teachings described herein.

In view of the wide variety of embodiments to which the principles of my invention can be applied, it should be understood that the illustrated embodiments are exemplary only, and should not be taken as limiting the scope of my invention. Rather, I claim as my invention all such embodiments as come within the scope and spirit of the following claims and equivalents thereto:

I claim:

1. A method for formatting a main electronic document to include one or more other electronic documents for display, the main electronic document readable by a computer software application, the main electronic document including content for display, the method comprising the following steps:

inserting a reference tag into the main electronic document to nest therein another electronic document including content for display, the content of the nested electronic document displayed in an overlapping manner with the content of the main electronic document when the main electronic document is displayed;

with the reference tag, specifying a display layout for the nested electronic document; and with the reference tag, specifying display techniques for the nested electronioc document.

2. A computer-readable storage medium having stored therein instructions for causing a computer to perform the method of claim 1.

3. The method of claim 1 wherein the reference tag includes a beginning and an ending reference tag marker.

4. The method of claim 1 wherein the step of specifying a display layout or the nested electronic document includes specifying the alignment, border, width, height, vertical spacing, horizontal spacing, nested document identifier and display style of the nested document.

5. The method of claim 1 wherein the step of specifying display techniques for the nested electronic document includes specifying the frame border, margin height, margin width, nested document name, nested document source location, re-sizing and scrolling display techniques, where the nested document source location includes a uniform resource locator used to locate a nested electronic document.

6. The method of claim 1 wherein the reference tag includes a HTML <IFRAME> reference tag.

7. The method of claim 6 wherein the HTML <IFRAME> reference tag is terminated by a HTML </IFRAME> reference tag.

8. The method of claim 7 wherein the HTML <IFRAME></IFRAME> reference tag pair has attributes for display layout and display techniques that include align, border, frame border, height, horizontal spacing, nested document identifier, margin height, margin width, nested document name, re-sizing, scrolling, nested document source location, display style, vertical spacing and width.

9. The method of claim 1 further comprising:
   inserting a first set of reference tags into the main electronic document to nest a first set of electronic documents including content for display therein, the first set of reference tags including references to one or more first nested electronic documents;
   inserting into the first set of electronic documents, a second set of reference tags to nest a second set of electronic documents including content for display therein, the second set of reference tags including references to one or more second nested electronic documents; and
   displaying the content of the first set of electronic documents in an overlapping manner with the content of the main electronic document when the main electronic document is displayed; and
   displaying the content of the second set of electronic documents in an overlapping manner with the content of the first set of electronic documents.

10. A method for displaying a main electronic document and one or more other nested electronic documents included therein, the main electronic document readable by a computer software application, the electronic documents having content for display, the method comprising the following steps:
   parsing the main electronic document with the computer software application;
   determining from the parsing whether the main electronic document contains a reference tag to a nested electronic document; and
   if the main electronic document contains a reference tag to a nested electronic document:
      determining from the reference tag a display layout and one or more display techniques for the displaying the nested electronic document; and
      displaying the content of the nested electronic document in an overlapping manner with the content of the main electronic document.

11. A computer-readable storage medium having stored therein instructions for causing a computer to perform the method of claim 10.

12. The method of claim 10 further comprising:
   allowing a selection input for a new nested electronic document having content to be displayed using the client network application; and
   displaying the content of the new nested electronic document in an overlapping manner with the content of the main electronic document based on the selection input.

13. The method of claim 10 wherein the reference tag includes a HTML <IFRAME> reference tag.

14. The method of claim 13 wherein the HTML <IFRAME> reference tag is terminated by a HTML </IFRAME> reference tag.

15. The method of claim 10 further comprising:
   determining from the parsing whether the nested electronic document contains a reference tag to a second nested electronic document; and
   if the nested electronic document contains a reference tag to second nested electronic document:
      determining from the reference tag a display layout and one or more display techniques for the displaying the second nested electronic document; and
      displaying the content of the second nested electronic document in an overlapping manner with the content of the main electronic document.

16. The method of claim 15 wherein the content of the second nested electronic document is displayed in an overlapping manner with the content of the first electronic document, and the content of the first electronic document is displayed in an overlapping manner with the content of the displayed main electronic document.

17. A method for displaying a main electronic document and one or more other nested electronic documents included therein by reference tags, the main electronic document readable by a computer software application, the electronic documents having content for display; the method comprising the following steps:
   parsing the main electronic document with the computer software application;
   determining from the parsing if the main electronic document contains a reference tag recognizable by the computer software application, the reference tag referring to a nested electronic document;
   if the reference tag is recognizable by the computer software application, displaying the content of the nested electronic document in an overlapping manner with the content of the displayed main electronic document while ignoring any information tags associated with the reference tag; and
   if the reference tag is not recognizable by the computer software application, displaying the content of the main electronic document and any information tags associated with the reference tag, while ignoring the reference tag itself.

18. A computer-readable storage medium having stored therein instructions for causing a computer to perform the method of claim 17.

19. The method of claim 17 further comprising:
   determining whether the reference tag is recognized by a selected computer software application, and if so,
   using a display layout and one or more display attributes in a beginning marker of the reference tag to layout and display the content of a nested document in an overlapping manner with the content of the electronic document, and
   using any information tags included between the beginning reference tag marker and an ending reference tag marker to display information not related to the display of a nested electronic document.

20. The method of claim 17 wherein the reference tag has a beginning marker and an ending marker, and the information tags associated with the reference tag are included between the beginning and ending reference tag markers.

21. The method of claim 20 wherein the beginning and ending reference tag markers are the HTML <IFRAME> and </IFRAME> reference tags respectively, and the information tags associated with the reference tag are HTML information tags.

22. In an HTML document stored on computer-readable medium, the HTML document having content for display, an improvement comprising:
    a beginning HTML reference tag for displaying content of one or more nested documents in an overlapping manner with the content of the HTML document, the beginning reference tag having a plurality of attributes, the plurality of attributes including align, border type, frame border type, height, horizontal spacing, nested document identifier, margin height, margin width, nested document name, re-sizing, scrolling, nested document source location, style, vertical spacing and width attributes for laying out and displaying the nested documents; and
    an ending HTML reference tag for terminating the beginning HTML reference tag.

23. The HTML document of claim 22 wherein the beginning HTML reference tag and the ending HTML reference tags are the HTML <IFRAME> and </IFRAME> tags respectively.

24. The HTML document of claim 22 wherein HTML information tags are included between the HTML beginning and ending reference tags, the HTML information tags not related to the display of nested documents displayed within the HTML document.

25. The HTML document of claim 24 wherein the HTML beginning and ending reference tags and any HTML information tags included between the HTML beginning and ending reference tags comprise a container tag.

26. The container tag of claim 25 wherein the HTML beginning and ending reference tags are the HTML <FRAME> and </IFRAME> tags respectively.

27. In a first HTML document stored on a computer-readable medium, an improvement comprising:
    a first reference tag for defining a HTML frame to display a second HTML document within the HTML frame, the second HTML document having content for display;
    a second reference tag for nesting a third HTML document within the second HTML document, the third HTML document having content for display, the nesting causing the content of the third HTML document to be displayed in an overlapping manner with the content of the second HTML document when the first HTML document is displayed.

28. A method for formatting and displaying a main electronic document which includes one or more other electronic documents for display, the main electronic document readable by a computer software application, the electronic documents having content for display, the method comprising the following steps:
    inserting a reference tag into the main electronic document to nest an electronic document therein, the content of the nested document displayed in an overlapping manner with the content of the main electronic document when the main electronic document is displayed;
    with the reference tag, specifying a display layout for the nested electronic document;
    with the reference tag, specifying one or more display techniques for the nested electronic document;
    parsing the main electronic document with the computer software application;
    determining from the parsing whether the main electronic document contains a reference tag to a nested electronic document; and
    if the main electronic document contains a reference tag to a nested electronic document:
        if the reference tag is recognizable by the computer software application,
            determining from the reference tag a display layout and one or more display techniques for the displaying the nested electronic document,
            displaying the content of the main electronic document, and
            displaying the content of the nested electronic document in an overlapping manner with the content of the displayed main electronic document while ignoring any HTML information tags included between the beginning and ending markers of the reference tag;
        if the reference tag is not recognizable by the computer software application, displaying the content of the main electronic document and any HTML information tags included between the beginning and ending markers of the reference tag, while ignoring the reference tag itself.

29. A method for displaying a main electronic document and one or more nested electronic documents included therein, the main electronic document readable by a computer software application, the electronic documents having content for display, the method comprising the following steps:
    parsing the main electronic document with the computer software application;
    determining from the parsing whether the main electronic document contains a reference tag to a nested electronic document; and
    if the main electronic document contains a reference tag to a nested electronic document:
        determining from the reference tag a display layout and one or more display techniques for the displaying the nested electronic document;
        displaying the content of the main electronic document, wherein a space for the content of the nested electronic document is created within the displayed content of the main electronic document; and
        displaying the content of the nested electronic document within the space.

30. A method for displaying a main electronic document and one or more nested electronic documents included therein by reference tags, the main electronic document readable by a computer software application, the electronic documents having content for display, the method comprising the following steps:
    parsing the main electronic document with the computer software application;
    determining from the parsing whether the main electronic document contains a reference tag to a nested electronic document, the reference tag having one or more associated information tags;
    if the main electronic document contains a reference tag to a nested electronic document:
        determining whether the reference tag is recognizable by the computer software application;
        if the reference tag is not recognizable by the computer software application, displaying the content of the main electronic document and any information tags associated with reference tag; and if the reference tag is recognizable by the computer software application:

determining from the reference tag a display layout and one or more display techniques for the displaying the nested electronic document;

displaying the content of the main electronic document, wherein a space for the content of the nested electronic document is created within the displayed content of the main electronic document; and displaying the content of the nested electronic document within the space; and if the main electronic document does not contain a reference tag to a nested electronic document, displaying the content of the main electronic document.

* * * * *

UNITED STATES PATENT AND TRADEMARK OFFICE
CERTIFICATE OF CORRECTION

PATENT NO. : 6,031,989
DATED : February 29, 2000
INVENTOR(S) : John P. Cordell

It is certified that error appears in the above-identified patent and that said Letters Patent is hereby corrected as shown below:

Column 16,
Line 59, error reads electronioc, should read electronic

Column 19,
Line 39, error reads <FRAME>, should read <IFRAME>

After Column 22,
Line 9, the patent should include the following claims:

31. A method for formatting a main electronic markup language document to include one or more other electronic markup language documents for display, the electronic markup language documents readable by a computing device with a processor for display on a display device, the method comprising:

authoring a main electronic markup language document, the main electronic markup language document comprising content for display;

inserting a reference tag into the main electronic markup language document that identifies another electronic markup language document comprising content to be nested within the main electronic markup language document for display, the content of the nested electcronic markup language document displayed in an overlapping manner with the content of the main electronic markup language document when the main electronic markup language document is displayed; and within the nested electronic markup language document, specifying one or more attributes for formatting the content of the nested electronic markup language document for presentation.

32. A computer-readable storage medium having stored therein computer executable instructions for performing the method of claim 31.

33. The method of claim 31 further comprising:

within the reference tag, specifying an attribute that identifies a location for the nested electronic markup language document.

UNITED STATES PATENT AND TRADEMARK OFFICE
CERTIFICATE OF CORRECTION

PATENT NO. : 6,031,989
DATED : February 29, 2000
INVENTOR(S) : John P. Cordell

It is certified that error appears in the above-identified patent and that said Letters Patent is hereby corrected as shown below:

34. The method of claim 31 further comprising:

within the main electronic markup language document, specifying one or more attributes for formatting the content of the main electronic markup language document for presentation.

35. The method of claim 34 wherein the attribute for formatting the content of the main electronic markup language document for presentation is a style attribute.

36. The method of claim 31 wherein the attribute for formatting the content of the nested electronic markup language document for presentation is a style attribute.

37. A computer-readable storage medium having stored therein computer executable instructions for performing the method of claim 36.

38. A method for displaying on a display device a main electronic markup language document and one or more other nested electronic markup language documents included therein, the method comprising:

parsing the main electronic markuup language document, the main electronic markup language document comprising content for display;

determining from the parsing of the main electronic markup language document whether the main electronic markup language document comprises a reference tag to a nested electronic markup language document, wherein the nested electronic markup language document comprises content for display;

if the main electronic markup language document comprises a reference tag to a nested electronic markup language document:

parsing the nested electronic markup language document;

UNITED STATES PATENT AND TRADEMARK OFFICE
CERTIFICATE OF CORRECTION

PATENT NO. : 6,031,989
DATED : February 29, 2000
INVENTOR(S) : John P. Cordell

It is certified that error appears in the above-identified patent and that said Letters Patent is hereby corrected as shown below:

determining from the parsing of the nested electronic markup language document one or more attributes for formatting the content of the nested electronic markup language for presentation; and displaying the content of the nested electronic markup language document in an overlapping manner according to said one or more attributes and with the content of the main electronic markup language document.

39. A computer-readable storage medium having stored therein computer executable instructions for performing the method of claim 38.

40. The method of claim 38 wherein the attribute for formatting the content of the nested electronic markup language document for presentation is a style attribute.

41. A computer-readable storage medium having stored therein computer executable instructions for performing the method of claim 40.

42. The method of claim 38 wherein a network client performs the parsing, determining, and displaying, the method further comprising:

before parsing, receiving the main electronic markup language document over a television cable.

UNITED STATES PATENT AND TRADEMARK OFFICE
CERTIFICATE OF CORRECTION

PATENT NO.   : 6,031,989
DATED        : February 29, 2000
INVENTOR(S)  : John P. Cordell It is certified that error appears in the above-identified patent and that said Letters Patent is hereby corrected as shown below:

43. The method of claim 38 wherein a network client performs the parsing, detemining, and displaying, the method further comprising:

before parsing, receiving the main electronic markup language document over a satellite link.

44. The method of claim 38 wherein an Internet browser performs the parsing, determining, and displaying, the method further comprising:

before parsing, receiving by the Internet browser the main electronic markup language document over a modem link.

Signed and Sealed this

Seventh Day of August, 2001

*Attest:*

*Attesting Officer*

NICHOLAS P. GODICI
*Acting Director of the United States Patent and Trademark Office*